US008137431B2

(12) United States Patent
Hero et al.

(10) Patent No.: US 8,137,431 B2
(45) Date of Patent: Mar. 20, 2012

(54) FERTILIZER GRANULES AND MANUFACTURING PROCESS THEREOF

(75) Inventors: Heikki Hero, Espoo (FI); Mikko Lylykangas, Vantaa (FI)

(73) Assignee: Yara Suomi Oy (FI)

( * ) Notice: Subject to any disclaimer, the term of this patent is extended or adjusted under 35 U.S.C. 154(b) by 370 days.

(21) Appl. No.: 12/300,829

(22) PCT Filed: May 16, 2007

(86) PCT No.: PCT/FI2007/000134
§ 371 (c)(1),
(2), (4) Date: Apr. 23, 2009

(87) PCT Pub. No.: WO2007/132060
PCT Pub. Date: Nov. 22, 2007

(65) Prior Publication Data
US 2010/0031719 A1 Feb. 11, 2010

(30) Foreign Application Priority Data
May 17, 2006 (FI) .................................. 20060484

(51) Int. Cl.
*C05C 9/00* (2006.01)
(52) U.S. Cl. ........................................... 71/30; 71/64.03
(58) Field of Classification Search ................ 71/28–30, 71/64.03
See application file for complete search history.

(56) References Cited

U.S. PATENT DOCUMENTS

| | | | | | |
|---|---|---|---|---|---|
| 3,150,955 | A | * | 9/1964 | Smith | 71/28 |
| 3,252,785 | A | * | 5/1966 | Hoblit | 71/23 |
| 3,333,940 | A | * | 8/1967 | Ridgeway | 71/29 |
| 3,479,175 | A | * | 11/1969 | Johnson et al. | 71/29 |

FOREIGN PATENT DOCUMENTS

| | | |
|---|---|---|
| EP | 0068573 | 1/1983 |
| EP | 1070690 A2 | 1/2001 |
| EP | 1292537 | 3/2003 |
| GB | 881517 | 11/1961 |
| GB | 934121 | 8/1963 |
| WO | 9701518 | 1/1997 |
| WO | 9729061 | 8/1997 |

OTHER PUBLICATIONS

FR1432547(A); Mar. 25, 1966; Machine Translation (8 pages).
GB1225976A; Mar. 24, 1971; Abstract Only (1 page).
International Search Report; International Application No. PCT/FI2007/000134; International Filing Date May 16, 2007; 5 pages.
Written Opinion of the International Searching Authority; International Application No. PCT/FI2007/000134; International Filing Date May 16, 2007; 6 pages.

* cited by examiner

*Primary Examiner* — Wayne Langel
(74) *Attorney, Agent, or Firm* — Cantor Colburn LLP

(57) ABSTRACT

The invention relates to a fertilizer granule comprising both a nitrate and urea as the main nitrogen source. A mineral added during production is an important component in the composition, said mineral stabilizing these otherwise poorly compatible nitrogen compounds. A high nitrogen content is thus attained with ammonium nitrate concentrations falling below maximum limit values set by international legislation and classification, while at the same time the explosion risk particularly associated with the use of ammonium nitrate is avoided. The invention is also directed to a process for the production of the fertilizer granule of the above type, said process resulting in a fertilizer granule with excellent resistance properties and a high nitrogen content, wherein said granule may be coated by methods typical in the art, if desired.

14 Claims, No Drawings

FERTILIZER GRANULES AND MANUFACTURING PROCESS THEREOF

CROSS REFERENCE TO RELATED APPLICATIONS

This is a U.S. national stage of application No. PCT/FI2007/000134, filed on 16 May 2007. Priority under 35 U.S.C. §119(a) and 35 U.S.C. §365(b) is claimed from Finland Patent Application No. 20060484, filed 17 May 2006, the disclosure of which is also incorporated herein by reference.

The present invention relates to a fertilizer granule of a nitrogen fertilizer or a compound fertilizer, e.g. a NPK fertilizer, comprising both nitrate and urea as the main nitrogen sources, thus attaining high nitrogen levels with ammonium nitrate concentrations falling below maximum limit values set by international legislation and classification, while at the same time explosion risks associated with the use of ammonium nitrate are avoided. The invention relates also to a process for producing fertilizer granules of the above mentioned type having excellent resistance properties and high nitrogen content wherein said granules may be coated by methods typical in the art, if desired.

Urea as such is the most common nitrogen fertilizer in the world. Nitrogen content of crystal urea is 46%, which is the highest nitrogen content in solid fertilizers at present. Urea is commonly used as the main nitrogen source in fertilizers, urea being particularly popular in Far East and USA for rice cultivation. Urea fertilizers are sold in solid state as white crystals, granules or prills, as well as in liquid forms. Granules of urea fertilizers are typically soft and weak, thus lowering the applicability. Moreover, rather slow assimilation of urea nitrogen by plants and evaporation of ammonium (=greenhouse gas) in the air particularly under dry and hot conditions are also known disadvantages.

In Europe, ammonium nitrate is the most common nitrogen fertilizer, and serves as the nitrogen source in compound fertilizers. Ammonium nitrate is sold as porous or compact prills, crystals or granules. As a fertilizer, ammonium nitrate is used as such, typically containing between 30 and 34.5% by weight of nitrogen, or e.g. in the form of calcium ammonium nitrate (granulated with dolomite or calcite), the nitrogen content being typically in this case between 25 and 28% by weight.

Other nitrogen sources used in fertilizing applications include ammonium phosphates, potassium nitrate, magnesium nitrate, sodium nitrate, ammonium sulfate, and ammonium polyphosphate. Problems associated with these compounds include high price and low nitrogen content.

Compound fertilizers obtained by mixing said salts with other different salts are known in the art. When they are used, several or even all nutrients needed by plants during one growth period may be provided with one application. Such compound fertilizers include, among others, NPK fertilizers assuring the availability of main nutrients nitrogen, phosphorus, and potassium, and possibly trace elements by a single application.

Ammonium nitrate is typically produced by neutralizing nitric acid with ammonia. The product thus obtained may be either used as such, or mechanically mixed with other granular nutrient sources, or as starting materials for compound fertilizers described above. Generally, a requirement for a commercially significant pure ammonium nitrate is a nitrogen content higher than 33.5% by weight (35% by weight being the theoretical maximum), thus typically allowing for a content of about 4% by weight of additives improving physical properties. A very low water content, typically below 0.2% by weight, is normally necessary for high physical quality.

Mechanical properties of ammonium nitrate fertilizers are limited by volumetric changes characteristic of this salt, due to alterations in crystal structure at different temperatures. Of these, the irreversible swelling of the compound by 3.6% under typical application conditions at a temperature of about 32° C. during one heating cycle, for instance from 25° C. to 50° C., is most problematic. The problem is even more difficult in case the temperature is elevated and reduced several times across said transition point. In fertilizer applications, said swelling results in fracture and erosion of the fertilizer granules, tear of the bags and exposure of the product to ambient humidity. Quality problems in large scale shipping and long term storage may further be caused by aggregation of the prilled or granulated product, particularly due to hygroscopicity of ammonium nitrate. Solid ammonium nitrate absorbs humidity from the environment even at relatively low humidity levels. In an earlier patent of the applicant, EP1292537, an attempt was made to stabilize ammonium nitrate granules by mixing a reticulated metal silicate to nitric acid prior to neutralization with ammonia. Ammonium nitrate granules containing from 33 to 34% by weight of nitrogen in the form of nitrate and ammonium ions, and from 1 to 3% by weight of the reticulated metal silicate partly dissolved in the acid was obtained as the product.

Due to explosion risk, the use of ammonium nitrate in fertilizers is prohibited in several countries. For a long time, attempts to improve the safety of ammonium nitrate fertilizers have been made by dilution thereof with different inert ingredients such as sand, calcium carbonate, ammonium phosphate and/or calcium sulfate. The aim was to provide an inflammable and inexplosive mixture typically containing between 70 and 80% by weight of ammonium nitrate, thus assuring a satisfactory nitrogen level. Typically, the ingredients are directly added to the ammonium nitrate melt, resulting in a substantially homogeneous prill or granule as the final product.

Inorganic salts containing nutrients for plants may normally be mixed without problems to give compound fertilizers. However, some poorly compatible mixtures are known to those skilled in the art, the mixture of urea and ammonium nitrate being particularly well known due to its extremely strong hygroscopicity. The critical relative humidity, CRH, of the mixture is significantly lower than that of each pure component: at 30° C., CRH of urea is between 70 and 75%, and that of ammonium nitrate between 55 and 75%, whereas the critical relative humidity of the mixture of the two is only about 18% [Fertilizer manual, $3^{rd}$ Edition, Kluwer Academic Publishers, 1998, p. 484]. In practice, this means that under normal application and storage conditions, a solid granule or prill absorbs humidity in amounts slurrying the granule or prill very quickly. Moreover, there is a risk of formation of the very explosive urea nitrate under acidic conditions with free $HNO_3$.

The document U.S. Pat. No. 4,026,696 discloses a process for coating a nitrogen fertilizer with calcium sulfate. The process is based on high temperatures partly melting the urea or ammonium nitrate that thus react with calcium sulfate and form an encapsulated prill. In the document, the properties of the granule during storage were said to be weak; the nitrogen source inside the coating absorbed water and was dissolved therein, thus giving the coating in the form of a hollow shell. In the examples, the fertilizer is urea except for one example directed to a ammonium nitrate fertilizer. While a mixture of ammonium nitrate and urea is mentioned in the document, no support or example for such an embodiment is provided that would encourage those skilled in the art to combine said nitrogen sources contrary to the generally accepted opinion. In this document, no reference to the weight ratio of these nitrogen sources is made, and no mention as to which of the components is the main component is found. In fact, even in the introduction of the document, known incompatibility of the compounds is referred to.

Also the document GB 1183938 use the term ammonium nitrate and/or urea when describing a process for producing a nitrogen fertilizer by dropping molten material through a fluidized bed composed of dust particles. In the document, examples describe experiments for coating ammonium nitrate with phosphate and potassium salts, without describing urea or a combination of the nitrogen sources mentioned. In practice, it would be impossible to dry granules obtained from mixtures of urea and ammonium nitrate obtained by these processes, or the granules would slurry at the end of the process.

The applicant has previously made experiments where low amounts of urea are added to ammonium nitrate. No granular products were obtained from these mixtures, but urea remained as a powder on the granulator.

It has now been found that a mixture of one nitrate or several nitrates and urea may be produced for use as a fertilizer without disadvantages mentioned above if a reticulated metal silicate is used as a third component in a substantially homogeneous mixture. Surprisingly, product properties of such a fertilizer granule are equal or superior to those of corresponding nitrate fertilizer granule without urea. Due to higher nitrogen content of urea, proportion of nitrate in the formulation may be reduced and replaced with other ingredients or trace elements without lowering the total nitrogen value.

In experiments presented in the examples for verifying the present invention, also comparison samples containing ammonium nitrate and urea were used without reticulated metal silicate. A conclusion may be readily drawn from the experiments that product properties of a fertilizer containing 27% by weight of nitrogen, composed of ammonium nitrate and gypsum or dolomite, mixed with urea, are not as good as those of a sample also containing reticulated metal silicate. This suggests that the favorable impact of urea may be utilized in fertilizer applications only in the presence of a reticulated metal silicate.

With respect to calculated ratios, a nitrogen content of about 20% by weight is attained by the process of the invention with fertilizers containing 5% by weight of urea and only 50% by weight of ammonium nitrate. On the other hand, a preferable ammonium nitrate proportion of 69% by weight and an urea addition of 10% by weight result in the increase of the nitrogen content of the fertilizer to a value of nearly 29% by weight. Formulations of these examples may thus also contain other components such as other main nutrients, trace elements and constituents improving processability, stability or economics. A calculated nitrogen content of 32.6% by weight is obtained by calculating on the basis of maximum limit values for the respective contents, that is 80% by weight of ammonium nitrate and 10% by weight of urea. All exemplary compositions mentioned above also contain a reticulated metal silicate in proportions consistent with the invention.

Moreover, the composition of the fertilizer granule according to the invention allows for some special applications that have so far been impossible on the basis of prior knowledge. With respect to product safety, it has also been possible to considerably increase the thermal dissociation temperature of the product.

With the composition of the invention in the fertilizer having a decreased nitrate content, a high nitrogen content is still attained by employing urea, while granulation and slurrying problems are avoided probably due to the reticulated metal silicate. In granulation, it was unexpectedly possible to obtain a better granulating efficiency and to increase the capacity of the apparatus used in comparison to ammonium nitrate granules without urea addition.

Advantages of the mixture of the invention include superior physical properties of the granules made therefrom, even as exposed to environmental humidity (example 1). Granules of the invention are resistant to load and fracturing and further, they will not agglomerate nor produce dust. Such properties were unpredictable since, as is known, urea granules are weak as such, and previous drying of mixtures containing ammonium nitrate and urea was very complicated owing to extreme hygroscopicity and low CRH point thereof.

Accordingly, an object of the invention is to provide a fertilizer with a high nitrogen content, said fertilizer being mechanically stable enough and convenient for the user, and further, safe under various shipping, storage and application conditions. The fertilizer is in a form common in the art e.g. as granules or prills. An object is also to provide a production method that is as uncomplicated as possible. These objects are now attained with a fertilizer granule containing nitrate or nitrates by substituting urea for part of the nitrate(s), thus lowering the nitrate content of the product for the improvement of the safety properties thereof without compromising the nitrogen content, while assuring desired physical properties of the product by the addition of reticulated metal silicate.

More precisely, the object of the invention is defined in the accompanying claims.

The fertilizer granule of the invention is characterized in that it comprises a nitrate or nitrates, urea and a reticulated metal silicate in the form of a substantially homogeneous mixture.

Said nitrate may be ammonium nitrate, sodium nitrate, potassium nitrate or another nitrate normally used in the field. It may also contain two or several of the nitrates mentioned. Particularly favorable compositions include ammonium nitrate or a mixture of ammonium nitrate and potassium nitrate. Commercially available nitrates are either of technical purity or may contain minerals as impurities, suitable for fertilizer applications. In case the nitrate is ammonium nitrate, the ammonium nitrate content of the product granule of the invention is up to 80%, preferably up to 75%, and more preferably up to 69%, by weight. A preferable embodiment comprises a mixture containing ammonium nitrate, a reticulated metal silicate and urea, the proportions of said constituents ranging respectively from 51 to 80%, 3 to 15%, and 3 to 10%, by weight, the mixture also optionally containing other constituents.

An example of a useful starting material is a commercial ammonium nitrate fertilizer containing about 74% of ammonium nitrate, about 14% of phlogopite and 12% of calcium sulfate-dihydrate, all percentages being by weight.

By a substantially homogeneous mixture is meant here that the nitrate or nitrates, urea and reticulated metal silicate and any optional additives or micronutrients are added and mixed together prior to granulation, and said mixture may be granulated to give granules having uniform composition without visible layers or concentration gradients. Various additives and trace nutrients may be optionally incorporated into the fertilizer granule according to the requirements of different applications. These additives or trace nutrients to be incorporated typically include K (as a chloride or sulfate), P (as phosphates), and S (as asulfate). In addition, preferable nutrient sources include sulfates of Ca, Mg, Na, Co, Cu, Fe, Mn and Zn, and further, Na borate and Na molybdate.

The fertilizer granule may be coated with a coating agent typical in the art, applied on the granule by any method known as such. The granule then comprises a coating layer on the outer surface of the substantially homogeneous granule. In one embodiment, agents preventing agglomeration are used, mixtures of organic oils and primary amines being (non-limiting) examples of said agents. Talc may be applied on the granule thus obtained. Prior to coating, wet granules are dried at a temperature of 80 to 150° C. to give a moisture content of less than 2% by weight. Also other coatings are known in fertilizer industry, and application thereof on the surface of the inventive granule is well within the knowledge of those skilled in the art.

The product is preferably endowed with the following properties. Total nitrogen content of the nitrogen fertilizer granule of the invention where the nitrogen source contains ammonium nitrate is preferably at least 20%, more preferably at least 25%, by weight. In the NPK fertilizer, the total nitrogen content of the granule is at least 10% by weight. Water content of the fertilizer granule of the invention is preferably less than 2% by weight. Caking properties of the product are such that the cake formed after exposure to humidity comprises less than 5% of the total sample mass. Further, dust is formed in an amount of less than 100 mg/kg, the resistance being at least 40 N. Typical particle size of the product (diameter) varies between 2.4 and 4.0 mm.

Decomposition onset temperature in differential scanning calorimetry, illustrating the resistance to elevated temperatures, is preferably at least 220° C. and more preferably at least 240° C. for the NPK fertilizer of the invention. The decomposition onset temperature in differential scanning calorimetry for a nitrogen fertilizer containing ammonium nitrate or comprising ammonium nitrate as a nitrogen source is preferably at least 240° C. and more preferably at least 280° C.

The invention is further directed to a process for the manufacture of a fertilizer granule producing a granule containing nitrate(s), urea and reticulated metal silicate, said constituents being present in the product in the form of a substantially homogeneous mixture.

The nitrate in the starting material may be ammonium nitrate, sodium nitrate, potassium nitrate or another nitrate commonly used in the art as described for the product. In a typical exemplary process, ammonium nitrate is used as the nitrate, produced by neutralizing nitric acid by ammonium gas. In the process of the invention, the mineral containing reticulated metal silicate is added during the production process of ammonium nitrate.

Reticulated metal silicate refers here to mica silicates such as biotite, phlogopite, and muscovite or vermiculite, or a mixture thereof. Any layered silicate having a reticulated metal structure, and containing potassium, magnesium and/or iron may be expected to behave in a similar way. Once biotite, phlogopite, or muscovite is treated with an acid, nitric acid, or a mixture of nitric and hydrochloric acids as described, the mineral thus treated may be referred to as acidified biotite, acidified phlogopite, or acidified muscovite, respectively. The silicate mineral is added to the acid prior to neutralizing of the latter by ammonia. Optionally, if vermiculite is used, the silicate mineral may be added to the neutralized slurry without acidification. The reaction may be optionally enhanced by a low amount of sulphuric acid, said amount being between 1 and 10% by weight, relative to nitric acid. Weight ratio of the reticulated metal silicate to urea is 0.5 to 15:1.

Ammonium nitrate containing a reticulated metal silicate may be produced for instance according to the process disclosed in EP1292537 of the applicant. In this document, mica present in the granule is treated with nitric acid prior to granulation of the fertilizer. The reticulated metal silicate and ammonium nitrate thus treated are slurried in water. In the process of the invention, the main component is essentially ammonium nitrate that may optionally contain low amounts of other compounds proved to be favorable for the production.

While urea used as the starting material is typically solid, also urea in solution may be employed. Urea is sold in pure form, or in a form containing low amounts of impurities.

The addition of urea may be performed in various alternative ways.

As an example, urea may be added during granulation step. In this case, dry constituents are introduced on a granulator followed by the addition of a slurry containing a nitrate salt and water thereon. In the process of the invention, the slurry also contains the reticulated metal silicate. Said slurry containing the nitrate, reticulated metal silicate, and water is passed on the dry constituents typically at a temperature of 110-130° C. In embodiments where the nitrate is ammonium nitrate, the aqueous solution contains from 60 to 80% by weight of ammonium nitrate. The slurry thus obtained is granulated and dried by methods known in the art.

The term dry constituents refers here to urea and any other additional nutrients or micronutrients to be added as powders, crystals or granules, or other ingredients typical in the art.

Another way for the addition of urea is to mix it to a supersaturated salt solution containing neutral or slightly acidic ammonium nitrate, reticulated metal silicate any other additives. Urea is added in the form of a concentrated solution or in solid state: in crystalline, granulated, powdered or prilled form. Thereafter the mixture is granulated by any method typical in the art: drum or plate granulation, or a combination of drum granulation/drum drying (so-called spherodizer granulation).

High temperatures are not necessary for drying, but the granule may be dried at 70 to 80° C., thus attaining moisture contents of less than 2%, preferably less than 1% by weight. After drying, the desired grain size may be obtained by sieving, followed by recycling of the granules with undesirably low or high grain size to the granulator or to the supersaturated salt solution to be granulated.

In one embodiment, the process of the invention may be utilized for the safe addition of copper to an ammonium nitrate fertilizer containing KCl, which was earlier considered to be impossible. The invention is also directed to the product obtained by this process.

The invention is now illustrated with working examples.
Nitrogen Fertilizers Based on Ammonium Nitrate

EXAMPLE 1

Partial substitution of urea and gypsum for ammonium nitrate

A commercial ammonium nitrate fertilizer containing about 74% of ammonium nitrate (26% of N), 14% of phlogopite treated with nitric acid, and 12% of calcium sulfate was slurried in 8% of water at 90° C., followed by the addition of granular urea in an amount of 3.2% (Yara) and 1.1% of calcium sulfate dihydrate (Kemira Siilinjärvi, Finland) to serve as an inert filler to allow for the comparison of the composition of the invention with a control (identical nitrogen contents), all percentages being by weight. The ratio of the reticulated metal silicate to urea is 4.4. Calculated nitrogen content is thus 26.2%. The slurry was mixed for 15 minutes, followed by slow drying to a moisture content of 1.2%, by weight. The dried and crushed reaction product was granulated using water and a plate granulator, the humidity being about 5% by weight. After granulation, the product was slowly dried at about 70° C. and coated with a mixture of mineral oil and primary amine (EOL289, 0.3% by weight), and further with talc (0.4% by weight). The properties of the product thus obtained were compared with a control slurried and granulated in the same manner, yet without any urea and calcium sulfate additions. In the experiment, the batch size was 20 kg.

The results of the chemical analyses of the finished product are as shown in table 1 below.

TABLE 1

Results of the chemical analyses

|  | Control | Product of the invention |
|---|---|---|
| $NO_3$—N [%] | 12.7 | 12.4 |
| $NH_4$—N [%] | 12.6 | 12.3 |
| urea-N [%] | <0.1 | 1.4 |
| Total N [%] | 25.3 | 26.1 |

Quality properties of the product are presented in table 2. CRH is the value of the relative humidity of the surrounding air, above which water is absorbed by the sample. Absorption of humidity is measured as relative weight gain of the sample at a relative humidity of 80%. Caking is defined by applying a pressure of 1 kg/cm² on a sample bag of 100 g for 24 hours, followed by the determination of the relative weight of the cake formed (>5 mm) with respect to the total weight of the sample. Abrasion and shattering tendency are illustrative of the resistance of the granules to abrasive and fast impact stresses (the lower the value, the higher the resistance).

As may be seen from the table 2, the properties of the control (particularly the absorption of humidity and critical relative humidity) are not deteriorated but even improved by the addition of urea.

TABLE 2

Physical properties of the products prepared according to example 1

|  |  |  | Control | Product of the invention |
|---|---|---|---|---|
| CRH |  | [%] | 20 | 24 |
| Absorption of humidity (at a relative humidity of 80%) |  |  |  |  |
|  | 2 h | [%] | 2.9 | 2.8 |
|  | 4 h | [%] | 6.3 | 6.0 |
|  | 6 h | [%] | 8.8 | 8.2 |
| Caking |  |  |  |  |
| without wetting | relative amount of the cake | [%] | 0.0 | 0.0 |
|  | humidity | [%] | 0.00 | 0.03 |
| wetting for 2 h at a relative humidity of 75% | relative amount of the cake | [%] | 12.0 | 10.4 |
|  | humidity | [%] | 0.23 | 0.75 |
| Dust |  | [mg/kg] | <100 | <100 |

TABLE 2-continued

Physical properties of the products prepared according to example 1

|  |  |  | Control | Product of the invention |
|---|---|---|---|---|
| Granule strength |  |  |  |  |
| −3.15 + 2.8 mm | mean value | [N] | 61 | 65 |
|  | 5 max | [N] | 70 | 76 |
|  | 5 min | [N] | 53 | 55 |
| Abrasion |  | [%] | 0.5 | 0.0 |
| Shattering tendency |  | [%] | 27.0 | 26.5 |

EXAMPLE 2

Thermal Decomposition of a Nitrogen Fertilizer

Safety properties of the product and the control described in example 1 were examined using a differential scanning calorimetry (DCS). The instrument used was Mettler Toledo DSC821 calibrated using indium and zinc references. The temperature range in the dynamic measurement was from 25 to 420° C., the temperature being elevated at a rate of 5° C./min. For the measurements, about 3 mg of sample was weighed to a ceramic crucible coated with gold (Mettler ME-26731, 40 μl).

The most significant parameter obtained from DSC-measurements is the so-called onset temperature, at which exo-thermal decomposition reactions of the salts present in the fertilizer (mainly ammonium nitrate) are initiated. An interpretation of the results may be: the higher the onset temperature of the product, the better the thermal safety thereof. The results obtained with the product of the invention, and with the control are shown in table 3.

TABLE 3

Thermal properties of the products of example 1 as determined by DSC measurements

| Sample | $T_{onset}$/° C. | $T_{max}$/° C. | ΔH/J/g |
|---|---|---|---|
| Control | 235 | 278.4 | −1601.2 |
| Product of the invention | 286 | 339.7 | −1638.2 |

As may be seen from the results presented in table 3, the onset temperature ($T_{onset}$) of the product of the invention may be even 50° C. higher than that of the control, based on DSC measurements. The temperature corresponding to the maximum of the released energy ($T_{max}$) is consistent with the corresponding trend: clearly higher temperatures are needed for the complete decomposition of the product of the invention. Enthalpy difference associated with the decomposition reactions (ΔH) is practically identical.

EXAMPLE 3

Partial Substitution of Urea for Ammonium Nitrate in CAN and SAN Fertilizers

Partial replacement of ammonium nitrate with urea was studied using a product of the invention containing acidified phlogopite, and commercial CAN and SAN fertilizers. CAN or Calcium Ammonium Nitrate is a mixture of ammonium nitrate and calcite or dolomite, whereas SAN or Sulfur Ammonium Nitrate is a mixture of ammonium nitrate and calcium sulfate.

Nitrogen content of the CAN and SAN fertilizers used in these studies was 27%. The results were compared to those obtained with the nitrogen fertilizer of the invention containing ammonium nitrate, urea, calcium sulfate and acidified phlogopite, the calculated nitrogen content being thus 27.2% by weight. The purpose of the study was to confirm the hypothesis that a freshly acidified reticulated metal silicate is the component necessary for superior granulation and quality properties of the product in granular fertilizers containing ammonium nitrate and urea.

Each product was slurried in water (humidity being 7 to 10%) in a reactor at 90° C., followed by the addition of granular urea (Yara) in an amount of 6% by weight to the slurry. Accordingly, the weight ratio of the reticulated metal silicate to urea is 14:6. Each slurry was mixed for 15 minutes, then removed from the reactor and slowly dried in a warming closet.

The reaction products dried in the warming closet were crushed for granulation. Already during the crushing step, manipulation of the formulations without phlogopite (CAN and SAN) turned out to be difficult: crushed CAN+urea and SAN+urea mixtures were sticky and caked very easily in spite of the fact that the water content was reduced to a value <0.3% by weight during drying. Also granulation using a plate granulator was extremely difficult, and the granules formed were very unstable. On the contrary, the product of the invention could be granulated relatively easily, resulting in significantly stronger product granules. The quality results are presented in table 4. The products of the table are coated with a mixture of mineral oil and primary amine (EOL289, 0.3% by weight), and further with talc (0.4% by weight) as described in example 1.

TABLE 4

Physical properties of the products prepared according to example 3.

| | | | Product of the invention | CAN + urea | SAN + urea |
|---|---|---|---|---|---|
| CRH | | [%] | 25 | 20 | 19 |
| Caking | | | | | |
| without wetting | relative amount of the cake | [%] | 0.0 | 20.8 | 2.0 |
| | humidity | [%] | 1.27 | 0.86 | 0.39 |
| wetting for 2 h at a relative humidity of 75% | relative amount of the cake | [%] | 34.4 | 72.9* | 95.4* |
| | humidity | [%] | 2.19 | 1.53 | 1.54 |
| Granule strength | | | | | |
| −3.15 + 2.8 mm | mean value | [N] | 45 | 11 | 11 |
| | 5 max | [N] | 53 | 21 | 16 |
| | 5 min | [N] | 37 | 3 | 6 |
| Shattering tendency | | [%] | 28.1 | 59.2 | 60.4 |

Urea contents in all samples 6% by weight.
*cake feels wet and is extremely brittle As a conclusion from the results shown in table 4, the quality properties of the product of the invention containing acidified phlogopite are clearly better than those of CAN and SAN products containing urea. Especially the granule strength is higher (mean value being 45 N for the product of the invention and only 11 N for the CAN and SAN fertilizers containing urea). In addition, caking of the CAN and SAN fertilizers containing urea is clearly stronger in comparison to the products of the invention. This may be particularly clearly seen from the caking results for the wetted samples. It may also be seen that humid conditions are much better tolerated by the product of the invention without losing preferable product properties.

Compound Fertilizers Based on Ammonium Nitrate

EXAMPLE 4

Partial Substitution of Urea for Ammonium Nitrate in NPK Fertilizers

Commercial NPK fertilizer granules based on ammonium nitrate (20% of N, 2% of P, 12% of K, respectively based on weight) containing 5% by weight of phlogopite treated with nitric acid was slurried in water used in an amount of 8% by weight at a temperature of 90° C., followed by the addition of granular urea (Yara) in an amount of 1.5% by weight to the slurry. The total nitrogen content is thus increased to a value of 20.3%, by weight. The amount of the reticulated metal silicate is 3.33 times higher than that of urea. The slurry was mixed for 15 minutes, followed by slow drying to attain a moisture content of 0.16% by weight. The dried and crushed reaction product was granulated using water and a plate granulator, the humidity being about 5% by weight. After granulation, the product was slowly dried at about 70° C. and coated with a mixture of mineral oil and primary amine (EOL289, 0.3% by weight), and further with talc (0.4% by weight). The properties of the product thus obtained were compared with a control slurried and granulated in the same manner, yet without any urea and addition. In the experiment, the batch size was 20 kg.

The results of the chemical analyses for the final product are presented in table 5. As may be seen from the table, the addition of urea had no detrimental impact on the quality properties of NKP fertilizer, such as absorption of humidity, caking, or granule strength.

TABLE 5

Physical properties of the products prepared according to example 5.

| | | | Control | Product of the invention |
|---|---|---|---|---|
| Absorption of humidity (at a relative humidity of 80%) | | | | |
| 2 h | | [%] | 2.2 | 2.1 |
| 4 h | | [%] | 4.6 | 4.6 |
| 6 h | | [%] | 7.2 | 7.1 |
| Caking | | | | |
| without wetting | relative amount of the cake | [%] | 23.8 | 0.0 |
| | humidity | [%] | 0.92 | 0.84 |
| wetting for 2 h at a relative humidity of 75% | relative amount of the cake | [%] | 42.7 | 34.8 |
| | humidity | [%] | 1.72 | 1.35 |
| Dust | | [mg/kg] | <100 | <100 |
| Granule strength | | | | |
| −3.15 + 2.8 mm | mean value | [N] | 39 | 42 |
| | 5 max | [N] | 49 | 49 |
| | 5 min | [N] | 22 | 33 |
| Abrasion | | [%] | 0.0 | 0.0 |
| Shattering tendency | | [%] | 37.3 | 39.0 |

Urea content of 1.5% by weight in the product of the invention.

EXAMPLE 5

Thermal Decomposition of the NPK Fertilizer

Safety properties of the product and the control described in example 4 were examined using a differential scanning calorimetry (DCS). The instrument used was Mettler Toledo DSC821 calibrated using indium and zinc references. The temperature range in the dynamic measurement was from 25 to 420° C., the temperature being elevated at a rate of 5° C./min. For the measurements, about 3 mg of the sample was weighed to a ceramic crucible coated with gold (Mettler ME-26731, 40 μl).

The results for the product of the invention and control are presented in table 6. As may be seen from the table, the onset temperature ($T_{onset}$) of the product of the invention is 27° C. higher than that of the control, based on the DSC measurements, suggesting improved thermal stability. Enthalpy difference associated with the decomposition reactions (ΔH) is practically identical.

TABLE 6

Thermal properties of the products of example 4 as determined by DSC measurements

| Sample | $T_{onset}$/° C. | $T_{max}$/° C. | ΔH/J/g |
|---|---|---|---|
| Control | 217 | 308.2 | −2205.2 |
| Product of the invention | 244 | 297.0 | −2148.9 |

The invention claimed is:

1. A fertilizer granule, comprising a nitrogen source comprising
   one or several nitrate(s) selected from the group consisting of ammonium nitrate, sodium nitrate, and potassium nitrate,
   urea, and
   a reticulated metal silicate;
in the form of a homogeneous mixture that has a weight ratio of the reticulated metal silicate to the urea of 0.5:1 to 15:1, the amount of the reticulated metal silicate being 3 to 15 weight percent, based on the weight of the fertilizer granule, and the amount of the one or several nitrate(s) being 51 to 80 weight percent, based on the weight of the fertilizer granule.

2. The fertilizer granule according to claim 1, comprising other main or trace nutrients in addition to nitrogen.

3. The fertilizer granule according to claim 1, wherein the ammonium nitrate content of the granule is up to 80% by weight.

4. The fertilizer granule according to claim 3, wherein the total nitrogen content of the granule is at least 20% by weight.

5. The fertilizer granule according to claim 3, exhibiting an onset temperature by differential scanning calorimetry of at least 240° C.

6. The fertilizer granule according to claim 1, wherein the total nitrogen content of the granule is at least 10% by weight for a NPK fertilizer.

7. The fertilizer granule according to claim 4, exhibiting an onset temperature by differential scanning calorimetry of at least 220° C.

8. The fertilizer granule according to claim 1, further comprising a coating layer on the substantially homogeneous granule.

9. The fertilizer granule according to claim 8, exhibiting a mean granule strength of at least 40 N.

10. A process for the manufacture of the fertilizer granule according to claim 1, resulting in a granule comprising a nitrogen source comprising
    one or several nitrate(s) selected from the group consisting of ammonium nitrate, sodium nitrate, and potassium nitrate,
    urea, and
    a reticulated metal silicate,
in the form of a homogeneous mixture that has a weight ratio of the reticulated metal silicate to the urea of 0.5:1 to 15:1, the amount of the reticulated metal silicate being 3 to 15 weight percent, based on the weight of the fertilizer granule, and the amount of the one or several nitrate(s) being 51 to 80 weight percent, based on the weight of the fertilizer granule, the method comprising:
    preparing a slurry of reticulated metal silicate and said one or several nitrate(s),
    adding the urea, and
    granulating and drying the slurry so as to form said granule.

11. The process according to claim 10, wherein said adding the urea is selected from the group consisting of a) mixing said urea with the aqueous solution of the nitrate and reticulated metal silicate, b) adding said urea during the granulation stage, and c) introducing dry constituents on a granulator followed by the application of the slurry containing the nitrate, reticulated metal silicate and water thereon.

12. The process according to claim 10, wherein the reticulated metal silicate is acidified prior to the granulation of the fertilizer.

13. The process according to claim 10, further comprising treating the reticulated metal silicate with nitric acid prior to the granulation of the fertilizer.

14. The process according to claim 13, wherein said treating the reticulated metal silicate with nitric acid is conducted in the presence of sulfuric acid in an amount of between 1 and 10% by weight, based on the weight of the nitric acid.

* * * * *